Nov. 5, 1946.    H. G. HOFFER    2,410,443
APPARATUS FOR SHAPING OBJECTS PROVIDED WITH CURVED SURFACES
Filed May 25, 1945    2 Sheets-Sheet 1
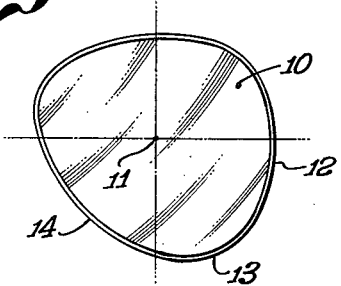
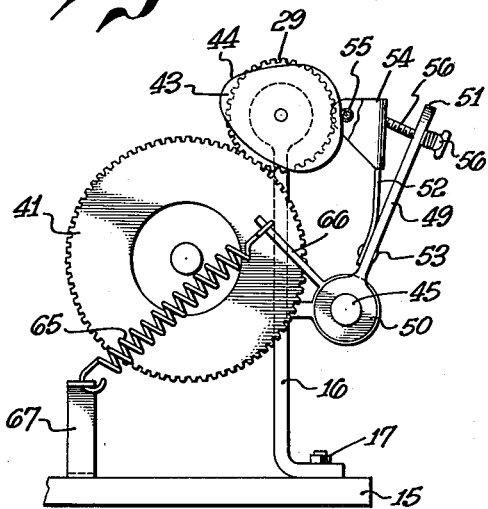
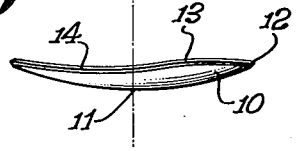
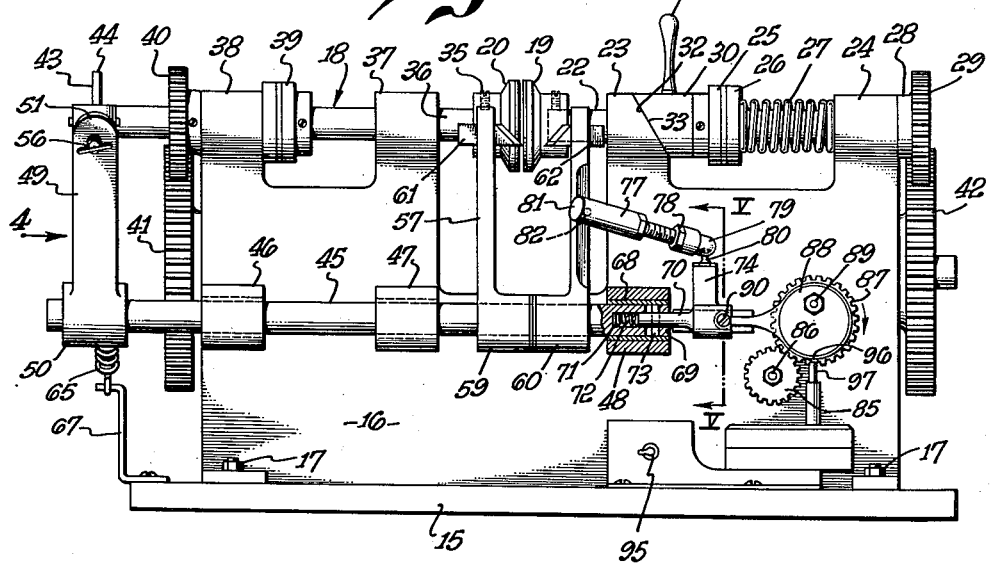
HOWARD G. HOFFER,
INVENTOR.
BY
ATTORNEY.

Nov. 5, 1946.  H. G. HOFFER  2,410,443
APPARATUS FOR SHAPING OBJECTS PROVIDED WITH CURVED SURFACES
Filed May 25, 1945  2 Sheets-Sheet 2
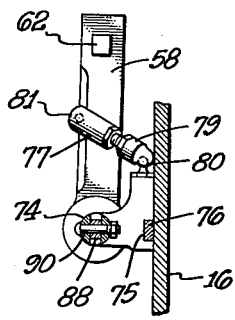
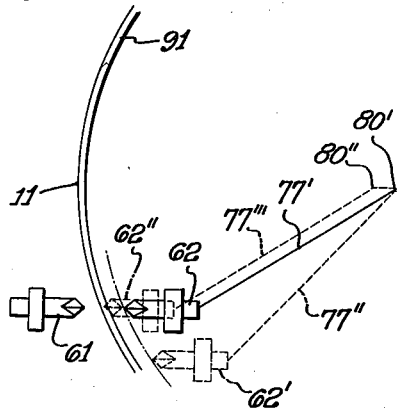
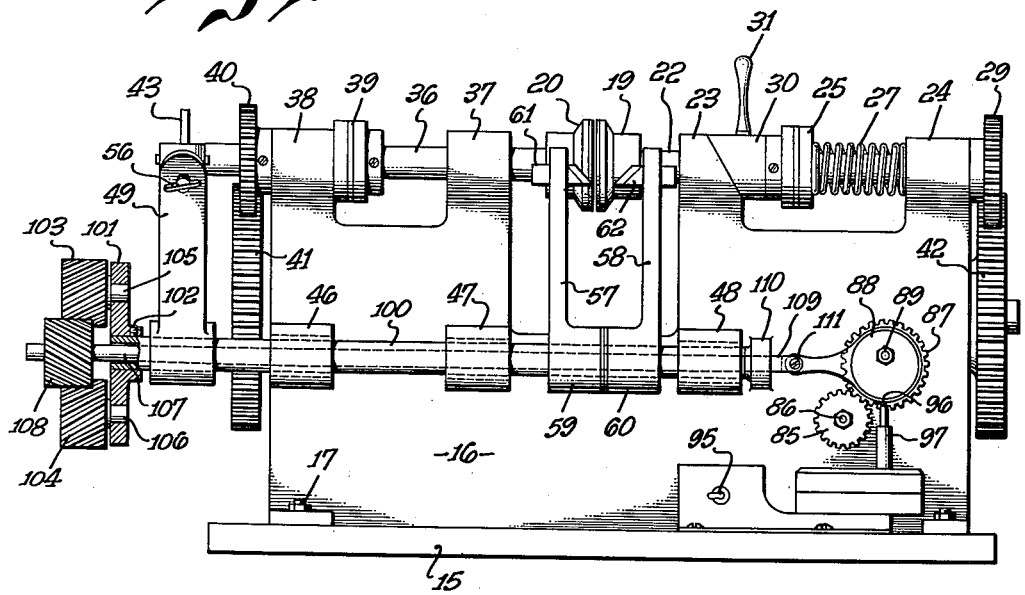
Howard G. Hoffer,
INVENTOR.
BY
ATTORNEY.

Patented Nov. 5, 1946

2,410,443

UNITED STATES PATENT OFFICE 2,410,443

APPARATUS FOR SHAPING OBJECTS PROVIDED WITH CURVED SURFACES

Howard G. Hoffer, Santa Monica, Calif.

Application May 25, 1945, Serial No. 595,858

20 Claims. (Cl. 82—18)

My invention relates to cutting machines of a type which may be classed as a lathe and which is particularly adapted to cutting and beveling the edges of lenses and similar objects.

Various machines have been devised for cutting lenses from blanks and even for cutting out lenses which have a concave shape and which have something other than a circular outline. The usual way of cutting lenses of this irregular shape is by use of a pattern cam or template in a machine provided with sufficient mechanism so that the lens cutting element traces the same path as the circumference of a pattern cam. The usual process is to first cut the lens from the blank and then after it has been cut to shape, bevel the edges in any manner desired. Because of the fact that when concave lenses are cut to an irregular shape, portions of the perimeter do not lie in the same plane and it has been necessary to provide special machinery for beveling the edge after the shape of the lens had been determined, or else to bevel the edge entirely by hand.

In order to increase the efficiency of a manufacturing lenses of this type, there has been a demand for a machine which wil simultaneously cut and bevel the edges of an irregularly shaped, concave lens so that the cutting and beveling may be completed in one operation.

It is therefore among the objects of my invention to provide a new and improved cutting machine which is adapted to simultaneously cut and bevel the edge of a non-circular, concave lens.

Another object of my invention is to provide a machine adapted to bevel both sides of the circumferential edge of a non-circular, concave lens so that as the bevels are cut from opposite sides, they will approach each other until the lens is completely cut out of the blank.

Still another object of my invention is to provide an automatic feed for progressively advancing a bevel cutter for the edge of a non-circular, concave lens so designed that the cutter will follow the variation in position of the edge of the lens characteristic of the perimeter of a non-circular, concave lens.

A further object is to provide a new and improved apparatus in which is incorporated an automatic feed in first one direction and then another by means of which a bevel may be cut in a non-circular, concave lens first upon one side and then upon the other in such a manner that the amount of the bevel on both sides can be regulated.

A still further object of my invention is to provide in a machine adapted to bevel-cutting the edge of a non-circular, concave lens, an automatic stop which will halt the operation of the machine as soon as a lens has been completely severed from the blank.

Another object is to provide a lens cutter in which the cutting blade follows a path determined by a pattern cam and in which is incorporated an adjustment which will permit changing the setting of the machine so that the same pattern cam may be used for cutting lenses of different sizes.

Still another object is to provide a lens cutter in which a flat pattern cam can be used to vary the position of a cutter blade both radially and longitudinally so that the blade will cut at a steady rate into the material of the lens blank under conditions where the perimeter of the lens traces a warped path varying both in radius from the central axis of the lens and in lateral displacement from a plane tangent to the center.

With these and other objects in view, my invention consists in the construction, arrangement and combination of the various parts of my device whereby the objects contemplated are attained, as hereinafter more fully set forth, pointed out in my c'aims and illustrated in the accompanying drawings, in which:

Fig. 1 is an elevational view of a typical spectacle lens.

Fig. 2 is a bottom view of the lens shown in Fig. 1.

Fig. 3 is a side elevational view of the apparatus used to cut and bevel lenses of the type shown in Fig. 1.

Fig. 4 is an end view of the apparatus shown in Fig. 3 taken in the direction of the arrow.

Fig. 5 is a partial end elevational view of a rocker shaft mechanism used in the apparatus of Fig. 3 and taken on the line V—V thereof.

Fig. 6 is a diagrammatic view of the action of the cutter blade.

Fig. 7 is a side elevational view of a modified form of my device.

In preparing a spectacle lens which will fit visual requirements most efficiently, it has been found that a dished or concave lens is most effective. It has also been found that in contrast to circular lenses first used for spectacles, a lens having an irregular outline is more advantageous. An irregular outline may be either for extending the lens surface in the direction in which the wearer most frequently directs his gaze or to style the lens in order to fit different faces.

Further, by reason of the fact that many lenses are now made of one type or another of transparent plastic rather than glass, a great variety of shapes and sizes have been resorted to.

When a lens is cut, whether it be of glass or plastic, the circumferential edge should be beveled in order not only to finish the lens but also to enable it to be firmly inserted into a suitable spectacle frame. As practiced in the past, it has been customary to first cut the lens from its blank and then bevel it. Much time could be saved if the beveling and cutting were performed in one and the same operation.

What has prevented the adaptation of a machine for performing both operations at once has been the fact that when concave lenses are cut to a non-circular outline, the edge of the lens will trace a wavy path throughout its circumference; that is to say the edge on all sides will not be the same distance from a plane perpendicular to the axis. Consequently an ordinary cutting tool placed in a lathe would not cut a bevel of the same depth on all sides of a lens of such shape. It accordingly becomes necessary to incorporate into a machine for simultaneously cutting and beveling a lens of this character, some mechanism which will force the cutting tool endwise in order to follow the contour of the lens so that the cut on all sides will be at a steady, predetermined rate and will finish with a bevel of the same size and depth on all sides of the lens. Since it is desirable to have the cutter work in from both sides, the machine should be able to follow the wavy contour of the lens whether the cutter be advanced from one side or the other or alternately from both sides so that the bevels on opposite sides (to all practicable purposes) meet at the center of the lens thickness at all points on the periphery regardless of the shape, size or base curvature of the lens.

Fig. 1 of the drawings shows a lens 10 of characteristic shape which has a central axis 11 and an irregular circumference 12 wherein all parts of the circumference are at different distances from the central axis of the lens. As viewed in Fig. 2, it will be apparent that the lens 10 is concave in shape so that points along the circumference 12 will be at different distances from a plane tangent to the lens at the central axis 11, thereby tracing, in effect, a wavy line at the circumference. For example, the circumference at the point 13 will be much further removed from the plane tangent at 11 than a point 14 on the circumference, due to the fact, as apparent from Fig. 1, that the point is at a much greater distance radially from the central axis 11 than the point 14. It will be apparent from an examination of these two figures that the position of the point 14 axially will be in relation to the position of the point 14 radially with respect to the central axis at the point 11. This ratio has been borne in mind in the design of a machine, one embodiment of which is illustrated by Figs. 3, 4, and 5.

In the machine or apparatus, there is provided a base 15 upon which is mounted a frame 16 bolted thereto by means of bolts 17. The frame supports a spindle member designated generally by the character 18, all parts of which are positioned in a horizontal direction relative to the base. The spindle is a compound element formed in part by a pair of opposed friction jaws 19 and 20 which are provided with complementary faces designed to engage a concave lens of the type shown in Fig. 1 and upon the surface of which is secured some friction means by which a lens may be firmly secured between the jaws so that the axis of the lens will coincide with the axis of the spindle member. The jaw 19 is secured to a spindle shaft 22. The spindle shaft is journaled in a bushing 23 adjacent the jaw and in an end bushing 24. A collar 25 is secured upon the shaft and rotates therewith. A presser plate 26 bears against the collar 25 and is urged thereagainst by means of a spring 27, the spring being interposed between the presser plate 26 and the bushing 24. In accordance with a construction common in the art, the shaft slides endwise within a sleeve 28 forming a part of a pinion 29 and the two parts are provided one with a slot and the other with a key, so that rotation of the pinion will cause rotation of the shaft, the pinion being fixed axially within the bushing 24.

An annular, wedge-shaped element 30 provided with a handle 31 fits loosely around the shaft and is adapted to be rotated so that a cam face 32 on the annular element moves with relation to a cam face 33 on the bushing 23 when the annular element is rotated, so that it will be forced in an axial or endwise direction against the collar 25 which will thereby shift the shaft in a position from left to right against the tension of the spring. Meanwhile the pinion remains in its initial position and the shaft moves within it in an endwise direction.

The jaw 20 is secured by means of a set screw 35 to a second spindle shaft 36 journaled in bushings 37 and 38 and provided with a collar 39 which can be adjusted in order to position the spindle shaft 36 endwise as may be desired. The spindle shaft 36 is likewise provided with a pinion 40 having the same number of teeth as the pinion 29. A gear 41 meshes with the pinion 40 and a gear 42 of similar size meshes with the pinion 29 so that both pinions are driven simultaneously at the same rate of speed, thereby causing the entire spindle member to rotate as a unit.

At the left end of the spindle shaft 36 as viewed in Fig. 3, there is mounted a pattern cam 43 having a circumference 44 corresponding in shape to the circumference 12 of the lens shown in Fig. 1. The pattern cam is attached non-rotatably to the shaft.

A rocker member comprises a rocker shaft 45 journaled respectively in bushings 46, 47 and 48. The cam follower arm 49 has an end 50 non-rotatably secured to the rocker shaft and a free end 51. Upon the rocker arm is a resilient extension 52 secured to the arm by a rivet 53 or some similar means at a point adjacent the rocker shaft. On the free end of the extension is a bracket 54 in which is rotatably mounted a cam-following wheel 55 which is adapted to engage the circumference or rim 44 of the pattern cam. An adjusting screw 56 is secured threadably in the free end of the arm and can be threaded in or out in order to shift the position of the cam-following wheel relative to the end of the arm and in this manner change the angular position of the cam-following wheel relative to the rocker shaft.

A pair of tool holding arms 57 and 58 is likewise provided respectively with bases 59 and 60 non-rotatably secured to the rocker shaft 45 and has bevel cutters 61 and 62 secured by suitable means to the free ends of the respective tool holding arms. The tool cutters have sharpened edges adapted to cut a lens of the shape shown in Fig. 1 from a blank of larger size and are shaped so that they can be advanced inwardly toward the surface of the lens blank, that is to say, in an axial direction relative to the spindle member.

The cam-following wheel 55 is normally retained in engagement with the circumference of the pattern cam by means of a coiled spring 65 which is secured at one end to a projection 66 forming part of the cam follower arm 49 and at the other end to a bracket 67 mounted on the base 15.

At the righthand end of the rocker shaft, as viewed in Fig. 3, there is provided a sleeve 68 non-rotatably secured to the shaft and extending within the bushing 48. The sleeve extends beyond the end of the shaft and is provided with a cap 69 spaced from the end of the shaft and providing a pocket. A stub shaft 70 extends through the shaft and slidably into a recess 71 at the end of the rocker shaft wherein it confines a coiled spring 72. The stub shaft is provided with a transverse pin 73 which is designed to pull against cap 69 while permitting the shaft and sleeve to rotate relative to the stub shaft, thereby enabling the cam shaft to be shifted endwise in response to movement of the stub shaft.

A base 74 forms part of the stub shaft and is provided with a recess 75 which is mounted upon and adapted to slide longitudinally on a gib 76.

In order that the rocker member may be shifted axially relative to the position of the stub shaft in response to movement of the cam follower arm and tool holding arms in a rotational direction, there is provided an arm or tie 77 in which is incorporated a threaded take-up 78 for varying its length when required. One end 79 of the tie is secured to the base of the stub shaft by means of a universal joint 80 and the other end 81 is secured to the tool holding arm 58 by means of a universal joint 82.

The entire rocker member is designed to be reciprocated back and forth at a predetermined rate in cooperation with rotation of the spindle member. For reciprocating the rocker member, there is provided a gear 85 mounted upon a shaft 86 which is driven from the source of power which drives the gears 41 and 42. The gear 85 meshes with a larger gear 87 and to the larger gear is secured an eccentric arm 88 by means of a pin 89. The eccentric arm has a swivel attachment 90 to the base 74 of the stub shaft 70. When the gear 87 is rotated, rotation of the pin 89 about the axis of the gear 87 will cause the eccentric arm to move from right to left and left to right, thereby effecting reciprocation of the entire rocker member in accordance with the rate of rotation of the gears 85 and 87.

In operating the device, the lever 31 is rotated, thereby separating the jaw 19 from the jaw 20 in order to permit a concave lens blank 91 of the type shown in Fig. 6 to be inserted between the jaws so that its center point 11 will be coincident with the axis of the jaws and the spindle member. The handle 31 is then released and the force of the coiled spring 27 will push the handle member back to its initial position and force the jaw 19 toward the jaw 20 so that the faces of the jaws bear frictionally upon the faces of the lens blank. The cutting tools 61 and 62 are then adjusted so that they extend toward the lens blank from opposite sides to a position spaced a relatively short distance from the surface of the lens blank which may be equal on opposite sides or variable, depending upon the character of the cut desired. At the start of the operation the eccentric 88 will be in the position shown in Fig. 3. At this initial position also, the cam-following wheel 55 will be positioned against the edge 12 of the pattern cam 10. If the lens to be cut is to be precisely the same size as the pattern cam, the adjusting screw 56 is set so that the points of the cutting tools are the same distance radially from the axis of the spindle member as the surface of the follower wheel in contact with the pattern cam.

To start the device in operation, a switch 95, which may be a time limit switch, is drawn to closed position and the gears 41 and 42, together with the gear 85, will then simultaneously begin to rotate. The gear trains are so designed that the spindle member operates very rapidly and the eccentric operates very slowly. A workable ratio is one wherein the eccentric rotates one revolution in sixty seconds while the spindle member rotates 120 times in the same length of time. The ratio, of course, may be varied, depending upon the material comprising the lens blank.

When the device begins operation, a cam 96 will rotate past the end of a switch lever 97 which, through a mechanism commonly known as a microswitch, will close the circuit through the motor which drives the apparatus. During the course of the first minute of operation, the time switch 95 will be tripped but the device will continue in operation while the microswitch remains in closed position. After one complete revolution, the cam 96 will again engage the switch lever 97, causing it to open the circuit and thereby automatically stop the apparatus at the completion of one revolution of the eccentric.

As the gear 87 rotates clockwise, as indicated by the arrow in Fig. 3, the eccentric will first pull the rocker member in a direction from left to right, causing the cutter tool 61 to first cut half-way through the lens blank and then will move the rocker member in a direction from right to left causing the cutter tool 61 to recede and the cutter tool 62 to advance, making a cut through the other half of the lens blank. At the end of one complete revolution, therefore, of the eccentric, the lens blank will be completely cut through at the outside edge.

As the spindle member rotates, the rim of the pattern cam will shift the position of the cam-following wheel 55, which in turn will rock the cam follower arm 49 and the attached shaft 45 back and forth throughout an angular distance determined by the shape of the rim of the pattern cam. As the rocker member is rocked back and forth, the position of the cutting tools 61 or 62, as the case may be, will likewise be rocked back and forth so that the points of the tools continuously trace a circumference precisely the same size as that of the rim of the pattern cam.

So that the cutting edge of the tools 61 and 62 follow the same wavy pattern of the finished lens, as illustrated in Fig. 2, they must be shifted from right to left and from left to right in order to conform to the true edge of the lens. This is made possible by reason of the connection of the tie or arm 77 between the two relatively moving parts of the rocker member, the action of which is shown diagrammatically in Fig. 6.

Since the length of the tie 77 is fixed and since the position of the end 79 thereof is fixed relative to the position of the stub shaft 70, as the cam follower arm 49 is rotated, simultaneously rotating the shaft 45 and tool holding arm 58, the end 81 of the tie will be moved outwardly relative to the end 79 because of the fixed length of the tie. As the end 81 is moved outwardly it will likewise be displaced longitudinally relative to the shaft 45 in a direction from left to right as viewed in Fig. 3. This will cause the tool holding arm 58 to be moved from left to right as well as all of the other parts attached to the shaft 45. The movement from left to right of the tool and subsequent movement from right to left will be in precise conformance with the purely radial movement of the cam-following wheel 55 outwardly and inwardly depending upon the shape of the circumference of the pattern cam.

For example, in the diagram illustrated in Fig. 6, the cutter 62 will have an initial position illustrated by the solid lines and in this position the length of the tie 77 between the tool and its relatively stationary point 80' will be illustrated by the length of the solid line 77'. Presuming that there is no feeding movement of the cutter endwise toward the blank during a portion of a revolution, if the cam-following wheel 55 is tracing the circumference of a pattern cam which is noncircular, as it recedes a greater distance from the central axis it will move the cutting tool 62 a greater distance from the central axis also so that it occupies a position 62' in Fig. 6. The position 62', it will be noted, is displaced from left to right by reason of the fact that the dotted line 77" remains the same length as the line 77' and pivots about the same center 80'. The displacement of the tool will be in an arcuate path determined by a radius equal to the distance 77' and this distance can be set with relation to the tie 77 so that for all practical purposes it is the same as the radius of curvature of the lens blank. This being so, the position of the tool will always follow the curved surface of the lens blank whether it be shifted closer to or further away from the center point 11 coinciding with the axis of the lens within the limitations of the machine.

The entire rocker member, including the tool 62, may then be fed into a cutting position from right to left as viewed in Fig. 6, so that the point 80' moves to a position 80" and subsequently further toward the left. This causes the tool 62 to move to a cutting position 62" but the distance 77''' between the new point 80" and the tool position 62" will continue the same as the distance 77'. From this position when the tool is displaced longitudinally from left to right, movement during displacement will follow an arc determined by the radius equal to the distance 77''' or 77' which will be precisely the same as the radius of curvature of the lens blank.

The depth of cut of the tool into the lens blank will continue at precisely the same rate regardless of how the circumference of the pattern cam may vary. In reverse direction the tool 61 will follow precisely the same pattern of movement. If more bevel is desired on one side than the other, the initial position of the lens blank between the cutting edges of the tools may be shifted in one direction or another by shifting the jaws 19 and 20, for example.

A modified form of my invention is shown in Fig. 7 wherein a set of spiral gears has been substituted for the tie 77 and the attendant mechanism identified in part by the stub shaft 70 and appurtenances attached thereto.

In the modified form the cam follower arm 49 and tool holding arms 57 and 58 are attached to a sleeve 100 which is journaled in the bushings 46, 47 and 48. At the left end of the sleeve is mounted a flange 101 non-rotatably secured to the sleeve by means of a set screw 102 and upon the flange is mounted a pair of spiral gears identified by the characters 103 and 104. The gears are fixed to the flange by means of stub shafts 105 and 106 so that they are not permitted to rotate relative to the flange.

Rotatably mounted within the sleeve 100 is a shaft 107 upon the left end of which is secured a spiral gear 108 designed to mesh with the teeth of the gears 103 and 104, the spiral gear 108 being non-rotatably secured to the shaft 107.

At its other end the shaft 107 may be provided with a squared portion 109 which is adapted to slide within a suitable bushing 110 but which prevents the shaft from rotating. The shaft 107 is reciprocated from right to left and left to right by means of the eccentric 88 previously described which is pivotally secured directly to the shaft by means of a pivot pin 111.

In the modified form as the spindle member rotates, thereby rotating the pattern cam 43, the cam follower arm 49 will be rotated, which will in turn rotate the sleeve 100. When this occurs the spiral gears 103 and 104 will rotate about the axis of the shaft 100 but since they do not rotate about their individual axes, the teeth of the spiral gears 103 and 104 will slide relatively to the teeth of the spiral gear 108 and since for a given position of the eccentric 88 the gear 108 remains fixed, the gears 103 and 104 will be displaced in a direction from left to right which will cause the sleeve 100 to move in a corresponding direction, thereby shifting the position of the tools 61 and 62 in accordance with a shift in the position of the cam-following wheel 55 in conformance with the outline of the pattern cam. Rotation of the cam follower arm 49 in an opposite direction will cause the gears 103 and 104 to move in an opposite direction relative to the gear 108 and thereby shift the sleeve 100 and the tools attached thereto in an opposite direction. By this mechanism the tools will be compelled to follow the surface of the lens blank in substantially the same manner as the tools in the form illustrated in Figs. 3 and 4. The gears 103, 104 and 108 will, of course, be selected as to relative size depending upon the radius of curvature of the lens blank and may be changed to fit lens blanks of different curvatures in much the same way that the tie 77 can be changed in length to fit lens blanks of a different curvature.

In the modified form when the eccentric 88 is rotated to effect a feeding of the tools through a cutting cycle, movement of the shaft 107 in response to the eccentric drive will be transferred from the teeth of the gears 108 to the teeth of the cooperating gears 103 and 104, thereby shifting the sleeve 100 and the attached arms in accordance with the shifting of the shaft 107. By this means the tools continue to shift back and forth in the desired relation to the pattern cam while the entire rocker mechanism is fed through a cutting cycle by means of the eccentric.

There has therefore been provided a simple lens cutting apparatus which is adapted simultaneously to cut and bevel lenses of odd shapes and sizes from a concave or convex lens blank which by a simple expedient maintains a bevel of precisely uniform size and depth regardless of the curvature or shape of the circumference of the lens. There is further incorporated into the machine the means for utilizing the same pattern cam for cutting lenses of any degree of curvature which may be desired.

I claim:

1. In an apparatus for cutting and beveling the edges of lenses and other objects provided with a curved surface: a rotatable spindle; means for holding a blank to be cut and edged in a plane virtually transverse to the axis of the spindle for rotation therewith; a pattern cam carried and rotated by the spindle; a rocker shaft parallel to the spindle and spaced therefrom; an arm mounted on the rocker shaft and provided with a follower to contact the pattern cam; a pair of tool holders mounted on said rocker shaft to hold opposing cutting and beveling tools in spaced and aligned relation with a blank extending therebetween; means for moving the rocker shaft axially to bring either of said tools into cutting relation with the blank; and means for translating transverse motions of the cutting tools under the influence of the pattern cam into a combined transverse and axial movement approximating the curve of the face of the object being cut.

2. In an apparatus for cutting and beveling the edges of lenses and other objects provided with a curved surface: a rotatable spindle; means for holding a blank to be cut and edged in a plane virtually transverse to the axis of the spindle for rotation therewith; a pattern cam carried and rotated by the spindle; a rocker shaft parallel to the spindle and spaced therefrom; an arm mounted on the rocker shaft and provided with an adjustably positionable follower to contact the pattern cam; a pair of tool holders mounted on said rocker shaft to hold opposing cutting and beveling tools in spaced and aligned relation with a blank extending therebetween, the follower and the cutting tools lying in a plane passing along the spindle axis; means for moving the rocker shaft axially to bring either of said tools into cutting relation with the blank; and means for translating transverse motions of the cutting tools under the influence of the pattern cam into a combined transverse and axial movement approximating the curve of the face of the object being cut.

3. In an apparatus for cutting and beveling the edges of lenses and other objects provided with a curved surface: a rotatable spindle; means for holding a blank to be cut and edged in a plane virtually transverse to the axis of the spindle for rotation therewith; a pattern cam carried and rotated by the spindle; a rocker shaft parallel to the spindle and spaced therefrom; an arm mounted on the rocker shaft and provided with a follower to contact the pattern cam; a pair of tool holders mounted on said rocker shaft to hold opposing cutting and beveling tools in spaced and aligned relation with a blank extending therebetween; means for moving the rocker shaft axially to bring either of said tools into cutting relation with the blank; and separate means for moving the cutting tools axially in varying increments as said tools approach and recede from the axis of rotation of the spindle.

4. In an apparatus for cutting and beveling the edges of lenses and other objects provided with a curved surface: a rotatable spindle; means for holding a blank to be cut and edged in a plane virtually transverse to the axis of the spindle for rotation therewith; a pattern cam carried and rotated by the spindle; a rocker shaft parallel to the spindle and spaced therefrom; an arm mounted on the rocker shaft and provided with a follower to contact the pattern cam; a pair of tool holders mounted on said rocker shaft to hold opposing cutting and beveling tools in spaced and aligned relation with a blank extending therebetween; means for moving the rocker shaft axially to bring either of said tools into cutting relation with the blank, said means including an eccentric driven with the spindle; and separate means for moving the cutting tools axially in varying increments as said tools approach and recede from the axis of rotation of the spindle.

5. An apparatus for bevel cutting opposite sides of the edges of lenses and other objects comprising a frame, a rotatable spindle thereon, power means for rotating the spindle, means for clamping a lens blank in a plane substantially transverse to the axis of the spindle and a pattern cam carried and rotated by said spindle, a longitudinally shiftable rocker shaft having thereon a cam follower and a pair of longitudinally opposed bevel cutters having an initial position wherein both lie in a position adjacent to but out of contact with the adjacent surface of the lens blank adapted to be spaced from the center of the blank in accordance with the position of the cam follower on the cam, and a feed mechanism for alternately moving the bevel cutters into operative position comprising a rotating element mounted on an axis transverse to the rocker shaft having a driving connection to said power means and a crank arm eccentrically mounted at one end on the rotating element and pivotally secured at the other end to the rocker shaft and adapted when moved in one direction by the eccentric element to advance one cutter through a cutting operation and when moved in the opposite direction to advance the other cutter through a cutting operation and cooperable arrester means between the feed mechanism and the frame adapted to interrupt operation of the feed mechanism at the completion of each complete cycle.

6. An apparatus for bevel cutting opposite sides of the edges of lenses and other objects comprising a frame, a rotatable spindle thereon, power means for rotating the spindle, means for clamping a lens blank in a plane substantially transverse to the axis of the spindle, a pattern cam carried and rotated by said spindle, a longitudinally shiftable rocker shaft having thereon a cam follower and a pair of longitudinally opposed bevel cutters having an initial position wherein both are in a position adjacent to but free from contact with the respectively adjacent surface of the edge of the lens and adapted to be spaced radially from the center of the blank in conformance with the position of the cam follower on the cam, and a feed mechanism for alternately moving the bevel cutters into operative position comprising a rotating element having a driving connection to said power means and a crank arm mounted at one end on the rotating element and pivotally secured at the other end to the rocker shaft and adapted when moved in one direction to advance one cutter through a cutting operation and when moved in the opposite direction to advance the other cutter through a cutting operation.

7. An apparatus for bevel cutting the edges of lenses and other objects comprising a frame, a rotatable spindle thereon, power means for rotating the spindle, means for clamping a lens blank in a plane substantially transverse to the axis of the spindle, a pattern cam carried and rotated by said spindle, a longitudinally shiftable rocker shaft having thereon a cam follower and a longitudinally disposed bevel cutter adapted to be spaced from the center of the blank in conformance with the position of the cam follower on the cam and a feed mechanism for moving the bevel cutter into operative position comprising a rotating element mounted on an axis adjacent the rocker shaft and a crank arm movably attached at one end to the rotating element and at the other end to the rocker shaft and adapted when moved in one direction to advance the cutter through a cutting operation and when moved in the opposite direction to remove it from cutting position.

8. An apparatus for bevel cutting the edges of concave, non-circular lenses comprising a frame, a rotatable spindle thereon, means for clamping a blank to be cut in a plane substantially transverse to the axis of the spindle, a pattern cam rotated by the spindle and a bevel cutter mechanism comprising a rotatably and axially movable rocker member including a shaft on the frame, a cam follower member on the shaft, a bevel cutter member on said shaft and means responsive to lateral movement of the rocker member adapted to move said cutter longitudinally comprising a tie having one end secured to the rocker member, a longitudinally movable element in endwise movable engagement with the rocker member and having a connection to the other end of the tie whereby when said cutter is rotated the effective axial distance between the ends of the tie is correspondingly varied and effects a corresponding axial shift of the cutter and the position of said bevel cutter is continuously shifted axially and longitudinally in conformance with the position of the cam follower on the cam to effect a cut on the edge of the blank.

9. An apparatus for bevel cutting opposite sides of the edges of concave, non-circular lenses comprising a frame, a rotatable spindle thereon, means for clamping a blank to be cut in a plane substantially transverse to the axis of the spindle, a pattern cam carried by and rotated by the spindle and a bevel cutter mechanism comprising a rotatably and axially movable rocker member including a shaft on the frame, a cam follower arm on the shaft, a pair of spaced oppositely disposed bevel cutter members on said shaft and means responsive to lateral movement of the shaft adapted to move said rocker member, said shaft and the cutters thereon longitudinally comprising a tie of constant length having one end secured to the rocker member and a non-rotatable longitudinally movable element in endwise movable engagement with the rocker member and having a connection to the other end of the tie whereby when said cutters and rocker member are rotated relative to the longitudinally movable element the effective longitudinal distance between the ends of the tie is correspondingly varied and effects a corresponding axial shift of the rocker member relative to the longitudinally movable element whereby the position of said bevel cutters on the edge of the concave blank is shifted both axially and radially in conformance with the movement of the cam follower over the cam to positions spaced variously relative to the central axis thereof during a cutting operation on the edge of the blank.

10. An apparatus for bevel cutting opposite sides of the edges of concave, non-circular lenses comprising a frame, a rotatable spindle thereon, means for clamping a blank to be cut in a plane substantially transverse to the axis of the spindle, a pattern cam carried by and rotated by the spindle and a bevel cutter mechanism comprising a rotatably and axially movable rocker member including a shaft on the frame, a cam follower arm on the shaft, a pair of spaced oppositely disposed bevel cutter members on said shaft and means responsive to lateral movement of the bevel cutter members adapted to move said sleeve and the cutters thereon longitudinally comprising a tie rod adjustable to a predetermined constant length having one end pivotally secured to one of the bevel cutter members, a non-rotatable longitudinally movable stub shaft in endwise movable engagement with the rocker shaft and having a pivotal connection to the other end of the tie rod whereby when said cutters and rocker shaft are rotated relative to the stub shaft the effective axial distance between the pivoted ends of the arm is correspondingly varied and effects a corresponding axial shift of the rocker shaft and cutters thereon relative to the stub shaft whereby the position of said bevel cutters on the edge of the concave blank is shifted axially in conformance with the position of the cam follower radially relative to the center of the cam to effect a cut on the edge of the blank and means for advancing the cutters in both directions longitudinally through a cut-off cycle.

11. An apparatus for bevel cutting the edges of dished, non-circular lenses comprising a frame, a rotatable spindle thereon bearing means for clamping a lens blank and a non-circular flat pattern cam, and a bevel cutter mechanism comprising a rotatably and axially movable carriage having a cam follower support, a bevel cutter member thereon and means responsive to angular movement of the carriage about its axis of rotation adapted to direct the cutter through a path corresponding to the projection of the flat pattern cam on a dished blank, said means comprising a shaft movable rotatably and axially relative to the carriage and a connection between the shaft and the carriage, one end of said connection having a relatively fixed position with relation to the frame, whereby movement of the carriage about the shaft is transformed partially into longitudinal movement of said carriage, and means for varying the location of the path of the bevel cutter relative to the axis of the lens blank comprising an extension mounted at one end on the cam follower support and having a cam contacting member on the free end and adjusting means for changing the position of the extension and the cam follower support.

12. An apparatus for bevel cutting the edges of dished, non-circular lenses comprising a frame, a rotatable spindle thereon including a lens mount for holding a blank in a substantially transverse plane and a pattern cam, a rocker member comprising a longitudinally shiftable carriage on the frame, laterally extending arms on the carriage respectively for a cam follower and a cutter arm, means for shifting said cutter endwise in conformance with the edge of the non-circular outline on the concave blank in response to a shift of the cutter radially relative to the spindle axis comprising a tie of fixed length secured at one end to the carriage and at the other end to a longitudinally movable element on the frame, said last element having an endwise movable connection to the carriage and means for shifting the bevel cutter longitudinally through a cutting cycle comprising a reciprocating element, and a crank attached to said element at one end and to the carriage at the other end adapted to impart to said carriage a reciprocating movement.

13. An apparatus for bevel cutting the edges of concave, non-circular lenses comprising a frame, a rotatable spindle thereon including a lens mount for holding a blank in a substantially transverse plane and a pattern cam, a rocker member comprising a longitudinally shiftable rock shaft on the frame, laterally extending arms separately attached to the shaft respectively for a cam follower and a cutter arm, means for shifting said cutter endwise to conform with the edge of the concave blank in response to a shift of the cutter radially relative to the spindle axis comprising a tie of fixed length secured at one end to the rocker member and at the other end to a longitudinally movable element on the frame, said last element having an endwise movable connection to the rocker member and means for shifting the bevel cutter longitudinally through a cutting stroke comprising an element continuously rotatable in one angular direction on an axis transverse to the rock shaft, a crank eccentrically pivoted to said element at one end and pivotally secured to the rocker member at the other end adapted to impart thereto a reciprocating movement on opposite sides of a center position and a common means for driving said spindle and said rotatable element.

14. An apparatus for bevel cutting the outline of lenses comprising a frame, a spindle thereon including a lens mount for holding a contoured and ground blank and a pattern cam of predetermined outline, a longitudinally shiftable rocker member mounted for movement laterally relative to the spindle, a bevel cutter and a cutter arm therefor secured to and adapted to move with the rocker member for bevel cutting the outside edge of the lens, and a pattern cam follower comprising a cam-engaging element, a follower arm attached to and rotatable with the rocker member and a resilient extension attached at one end to the follower arm intermediate the connection of said last arm to the rocker member and the free end thereof, said extension bearing said cam follower element at the free end thereof, and adjusting means cooperable between the ends respectively of the extension and the follower arm adapted to vary the distance therebetween whereby the same pattern cam provides an outline pattern for lenses of different sizes.

15. An apparatus for bevel cutting the outline of lenses and other objects comprising a frame, a spindle thereon including a lens mount for holding a ground and contoured blank and a pattern cam of predetermined outline, a longitudinally shiftable rocker member on a mounting substantially parallel to the spindle, a bevel cutter and a cutter arm therefor secured to and adapted to pivot with the rocker member for bevel cutting the outline of the lens and a pattern cam follower comprising a cam-engaging element of substantial breadth adapted to shift laterally relative to the pattern cam, a follower arm attached to and rotatable with the rocker member and a resilient extension attached at one end to the follower arm intermediate the connection of said last arm to the rocker member and the free end thereof, said extension bearing said cam follower element at the free end thereof, and an adjusting screw cooperable between the ends respectively of the extension and the follower arm adapted to vary the distance therebetween whereby the same pattern cam provides a pattern for lenses of different sizes.

16. An apparatus for cutting out lenses of irregular circumference from dished blanks comprising a frame, a rotating spindle including means for holding a blank and a pattern cam, a rocker member comprising a sleeve element and a sleeve, a shaft element slidably and non-rotatably mounted therein, a cam follower arm engaging the cam and a tool arm non-rotatably secured to one of said elements, means for shifting the position of the rocker member in a longitudinal direction and a connection between said elements comprising meshing opposed spiral gears mounted on parallel axes and adapted to displace said elements axially relative to each other in response to rotation of the cam follower arm and attached element relative to the other element an amount corresponding simultaneously to the curvature of the lens blank and the shape of the pattern cam.

17. An apparatus for cutting out lenses of irregular circumference from dished blanks comprising a frame, a rotating spindle including means for holding a blank and a pattern cam, a rocker member comprising a sleeve slidably journaled on the frame, a cam follower arm engaging the cam and a tool arm rotatable with the sleeve, a shaft in the sleeve and slidable relative thereto, means for shifting the position of the shaft in a longitudinal direction and a connection between said shaft and sleeve comprising meshing opposed spiral gears on parallel axes and adapted to displace said sleeve axially relative to the shaft in response to rotation of the sleeve relative to the shaft an amount corresponding simultaneously to the curvature of the lens blank and the shape of the pattern cam.

18. An apparatus for cutting out lenses of irregular circumference from curved blanks comprising a frame, a rotating spindle including means for holding a blank and a pattern cam, a rocker member comprising a sleeve slidably journaled on the frame, a cam follower arm engaging the cam and a tool arm non-rotatably secured to the sleeve, a shaft in the sleeve slidably and non-rotatably mounted on the frame, means for shifting the position of the shaft in a longitudinal direction and a connection between said shaft and sleeve comprising a spiral gear fixed to the shaft and meshing opposed spiral gears of diameter selected in accordance with the curvature of the lens blank rotatably mounted on the sleeve on parallel axes and adapted to displace said sleeve axially relative to the shaft in response to rotation of the sleeve relative to the shaft an amount corresponding simultaneously to the curvature of the lens blank and the shape of the pattern cam.

19. An apparatus for cutting out lenses of irregular circumference from curved blanks comprising a frame, a rotating spindle including means for holding a blank and a pattern cam, a rocker member rotatably journaled on the frame comprising a cam follower arm, a tool arm non-rotatably secured thereto and a slidable and non-rotatable second element having an endwise moving and laterally shiftable tie to the first element adapted to shift the relative position of said elements longitudinally in response to relative rotation laterally in conformance with the location of the cam follower arm on the pattern cam.

20. An apparatus for cutting out lenses of irregular circumference from curved blanks comprising a frame, a rotating spindle including means for holding a blank and a pattern cam, a rocker member comprising an element rotatably journaled on the frame, a cam follower arm engaging the cam, a tool arm non-rotatably secured to said element and a second element slidably and non-rotatably mounted on the frame having an endwise moving and laterally shiftable tie to the first element adapted to shift the relative position of said elements longitudinally in response to relative rotation laterally in conformance with the location of the cam follower arm on the pattern cam.

HOWARD G. HOFFER.